United States Patent
Lichon et al.

(10) Patent No.: US 6,342,092 B1
(45) Date of Patent: Jan. 29, 2002

(54) APPARATUS TO SEPARATE GAS FROM A LIQUID FLOW

(75) Inventors: Paul G. Lichon, Bothwell; Dieter M. Zube, Redmond, both of WA (US)

(73) Assignee: General Dynamics OTS (Aerospace), Inc., Redmond, WA (US)

( * ) Notice: Subject to any disclaimer, the term of this patent is extended or adjusted under 35 U.S.C. 154(b) by 0 days.

(21) Appl. No.: 09/414,223

(22) Filed: Oct. 7, 1999

(51) Int. Cl.$^7$ .............................................. B01D 19/00
(52) U.S. Cl. ............................ 96/179; 96/219; 210/188
(58) Field of Search ........................ 95/243, 241, 254, 95/260, 46; 96/155, 6, 179, 186, 189, 190, 193, 204, 219; 210/188

(56) References Cited

U.S. PATENT DOCUMENTS

| | | | |
|---|---|---|---|
| 2,306,297 A | * 12/1942 | Curtis | ..................... 210/188 |
| 2,592,685 A | * 4/1952 | Grise | ........................ 96/155 |
| 3,273,319 A | * 9/1966 | Jones et al. | ................. 96/204 |
| 3,488,926 A | * 1/1970 | Gilman | ....................... 96/204 |
| 3,631,654 A | * 1/1972 | Riely | ............................. 96/6 |
| 3,795,088 A | * 3/1974 | Esmond | ...................... 96/219 |
| 3,999,380 A | 12/1976 | Wiliams | |
| 4,070,277 A | 1/1978 | Uban et al. | |
| 4,272,257 A | 6/1981 | Ellion et al. | |
| 4,302,223 A | 11/1981 | Booth et al. | |
| 4,319,996 A | * 3/1982 | Vincent et al. | ............. 210/188 |
| 4,459,139 A | * 7/1984 | von Reis et al. | ............ 96/219 |
| 4,484,936 A | 11/1984 | Sakai | |
| 4,490,972 A | 1/1985 | Ellion et al. | |
| 4,743,278 A | 5/1988 | Yeh | |
| 4,828,587 A | * 5/1989 | Baurmesiter et al. | ......... 96/219 |
| 4,898,030 A | 2/1990 | Yeh | |
| 4,976,754 A | * 12/1990 | Edelstein et al. | ............ 96/219 |
| 4,995,231 A | 2/1991 | Smith et al. | |
| 5,064,153 A | 11/1991 | Gindre et al. | |
| 5,104,810 A | 4/1992 | Birbara et al. | |
| 5,209,115 A | 5/1993 | Bond | |
| 5,279,323 A | * 1/1994 | Grove et al. | .................. 96/219 |
| 5,334,239 A | 8/1994 | Choe et al. | |
| 5,427,334 A | 6/1995 | Rauscher, Jr. | |
| 5,507,858 A | 4/1996 | Jepson | |
| 5,640,844 A | 6/1997 | Pahl | |
| 5,695,545 A | 12/1997 | Cho et al. | |
| 5,711,877 A | 1/1998 | Gonzalez | |
| 5,746,050 A | 5/1998 | McLean et al. | |

OTHER PUBLICATIONS

Woven Wire Cloth, Woven Wire Cloth Division, Screen Technology Group, Inc. Sep. 1999 (www.home.pacifier.com/~stgi/index.html).

Sefar America Inc., Filtration and Separation Solutions, downloaded Oct. 1999 (www.tetko.com/fintro.htm).

Whitaker, A. The Microgravity Research Experiments (MICREX) Database, NASA Marshall Space flight Center, downloaded Oct. 1999 (www.mgravity.itsc.uah.edu/microgravity/micrex/exps/whi–astp.html).

DeBrock, S.C.; Grove, R.K.; Sloma, R.O.; Balzer, D.L.; Brill, Y.; and Yankura, G.A.; "A Survey of Current Developments in Surface Tension Devices for Propellant Acquisition", *J. Spacecraft,* vol. 8 No. 2, Feb. 1971, pp. 83–98.

\* cited by examiner

*Primary Examiner*—Duane S. Smith
(74) *Attorney, Agent, or Firm*—Gregory S. Rosenblatt; Wiggin & Dana

(57) ABSTRACT

A gas arrestor separates entrained gas from a liquid medium. The gas arrestor is a porous member, such as a woven mesh screen having pores of a size sufficiently small to enable liquid transport while inhibiting gas transport. Since the trapped gas has a tendency to accumulate on the porous member impeding continued liquid flow, a wick extends in an upstream direction from the porous member. When used in spacecraft to provide substantially gas-free liquid to a thruster, the gas arrestor is located between a tank of pressurized liquid propellant and a gas generator. Improved results are obtained by locating the gas arrestor between a pressure reducing liquid fluid resistor and the gas generator.

12 Claims, 4 Drawing Sheets

APPARATUS TO SEPARATE GAS FROM A LIQUID FLOW

BACKGROUND OF THE INVENTION

1. Field of the Invention

This invention relates to an apparatus for separating an entrained gas from a liquid. More particularly, a fine mesh screen transports the liquid by capillary action but inhibits the flow of entrained gas. Following gas separation, the liquid may be used for applications requiring a gasless, or reduced gas content, liquid including spacecraft propulsion, chemical process control and medical applications.

2. Description of Related Art

Spacecraft, such as satellites, frequently utilize electro-thermal arcjet thrusters for attitude and altitude adjustments. As disclosed in U.S. Pat. No. 4,995,231 to Smith et al., that is incorporated by reference in its entirety herein, electro-thermal arcjet thrusters convert electrical energy to thermal energy by heat transfer from an arc discharge to a flowing propellant and from thermal energy to directed kinetic energy by expansion of the heated propellant through a nozzle.

Most electrothermal arcjet thrusters have as common features an anode in the form of a nozzle body and a cathode in the form of a cylindrical rod with a conical tip. The nozzle body has an arc chamber defined by a constrictor in a rearward portion of the body and a nozzle in a forward portion thereof. The cathode rod is aligned on the longitudinal axis of the nozzle body with its conical tip extending into the upstream end of the arc chamber in spaced relation to the constrictor so as to define a gap therebetween.

An electric arc is first initiated between the cathode rod and the anode nozzle body at the entrance to the constrictor. The arc is then forced downstream through the constrictor by pressurized vortex-like flow of a propellant gas introduced into the arc chamber about the cathode rod. The arc stabilizes and attaches at the nozzle. The propellant gas is heated in the region of the constrictor and in the region of the arc diffusion at the mouth of the nozzle downstream of the exit from the constrictor. The superheated gas is then exhausted out the nozzle to achieve thrust.

The gaseous propellant for an electrothermal arcjet thruster is typically formed by catalytic decomposition of a liquid propellant in a gas generator. One liquid propellant employed for spacecraft propulsion is an autocatalytic liquid (spontaneously decomposes to gaseous products on contact with a catalyst), such as hydrazine ($N_2H_4$). Hydrazine decomposes to hydrogen gas and nitrogen gas on contact with an iridium catalyst in a gas generator. The hydrogen and nitrogen gases are converted to a high temperature plasma in an arcjet thruster and expelled at supersonic speeds through a nozzle propelling the spacecraft.

Typically, the liquid propellant is stored in a fuel tank. A pressurized gas pressurizes the liquid propellant so that the opening of a downstream thrust control valve initiates flow of the hypergolic fluid to the gas generator. The use of a pressurized gas to deliver a monopropellant to a gas generator is disclosed in U.S. Pat. No. 5,746,050 to McLean et al., that is incorporated by reference in its entirety herein. Pressurized helium gas is used to displace liquid hydrazine in the fuel tank. Helium bubbles may become entrained in the liquid hydrazine. By entrained, it is meant that the helium bubbles are suspended in the liquid and mechanically transported with the liquid, as distinguished from dissolution. Helium may also be dissolved and go into solution in the hydrazine. Dissolved helium may reform as entrained bubbles when the liquid hydrazine pressure drops.

At typical pressures employed in spacecraft propulsion systems, on the order of 80 psia to 100 psia at the gas generator, the helium bubbles can be large enough to cause the liquid hydrazine to be delivered to the gas generator as liquid slugs separated by helium bubbles or as liquid interspersed with a plurality of bubbles. When the liquid hydrazine contacts the catalyst in the gas generator, it rapidly decomposes into a large volume of gas, increasing the pressure in the gas generator. Helium does not react with the catalyst in the gas generator so that when a helium bubble passes through the gas generator, there is no increase in gas volume and the pressure in the gas generator drops. Fluctuations in the gas generator between high pressure when hydrazine is present and low pressure when helium is present causes pressure and mass flow rate oscillations in the gaseous product output. In an arcjet thruster, these pressure and mass flow rate oscillations may cause the electric arc to travel from the nozzle back into the throat generating the potential for the electric arc to either extinguish or erode the throat.

Spacecraft propulsion thrusters are generally small thrusters used after the spacecraft approaches orbital elevation and is in a microgravity environment. The spacecraft propulsion thrusters are used to make altitude and attitude adjustments to place, or return, the spacecraft in a precisely desired location. The adjustments require a continuous flow of liquid propellant for a precise amount of time. Gas entrained in the flow can lead to undesirable interruptions in the physical or chemical process taking place in the thruster. The flow interruptions can lead to instabilities or damage and also significantly reduce the lifetime of the unit.

Among the detrimental effects of gas entrained in the liquid propellant are positive voltage excursions whereby gas entrained in the liquid propellant at a pressure of 255 psia expands when transiting a fluid resistor and exiting the fluid resistor at a pressure of 100 psia. Rapid expansion of the gas provides a surge in the propellant flow downstream of the expanding gas increasing the volume of propellant gas delivered to the arcjet thruster and causing a voltage rise. A bubble of the size 0.040 $cm^3$ (at 255 psia) into the fluid resistor can cause a high voltage shutdown of the arcjet thruster.

Negative voltage excursions can occur when helium gas passes into the gas generator displacing hydrazine. This reduces the flow of propellant gas to the arcjet thruster causing the arc to pull back toward the constrictor. The increased concentration of arc on the electrode surface at the constrictor can cause abnormal heating and possible damage. Repeated gas ingestion increases electrode wear and possibly reduces thruster operating life.

Another scenario resulting in a negative voltage excursion is that the entrained gas is either generated or collected at the thrust control valve during arcjet operation and eventually migrates to the gas generator as a large gas bubble starving the gas generator of hydrazine and reducing the flow of propellant. Tests and analytical results indicate that a bubble as small as 0.001 $cm^3$ (at 255 psia) can cause a measurable voltage drop-off at the arcjet thruster, on the order of 5 volts. A bubble size of 0.008 $cm^3$ (at 255 psia) can cause a low voltage shutdown of the arcjet thruster.

Within a fuel tank, it is known to use propellant management devices to employ capillary action to draw liquid propellant from the tank while inhibiting the flow of a gaseous pressurant as disclosed in U.S. Pat. No. 4,272,257.

One material disclosed in U.S. Pat. No. 4,743,278 for use in a propellant management device is a titanium or steel sheet with small, on the order of 0.0015 inch, perforated holes. A description of the use of capillary action to separate a gas from a liquid is found in U.S. Pat. No. 5,711,877.

Each of U.S. Pat. Nos. 4,272,257; 4,743,278 and U.S. Pat. No. 5,711,877 is incorporated by reference in the entirety herein.

U.S. Pat. No. 5,746,050 discloses devices such as ultrasonic transducers and externally driven flow agitators disclosed upstream of the gas generator to reduce the size of gas bubbles entrained in the liquid propellant and thereby reduce the potential for damage to the gas generator and the arcjet thruster. The propellant management devices disclose methods for reducing or eliminating entrained gas from liquid propellant exiting a fuel tank but do not address problems associated with entrained gas downstream of the fuel tank. There remains, however, a need for a liquid/gas separator that removes entrained gas as opposed to the reduction of bubble size and is capable of removing the entrained gas downstream from the fuel tank.

SUMMARY OF THE INVENTION

Accordingly, it is a first object of the invention to provide a gas arrestor that effectively separates an entrained gas from a liquid medium. It is a second object of the invention to incorporate the gas arrestor into a spacecraft propulsion system such that entrained gas does not interfere with proper operation of spacecraft thrusters.

It is a feature of the invention that the gas arrestor is a porous member having pores of a size effective to enable the passage of liquid medium while inhibiting the transport of the gas due to the surface tension of the gas. It is another feature of the invention that the porous member is preferably a woven screen mesh and may be formed from titanium or a titanium base alloy. It is a feature of one embodiment of the invention that a wick extends from the porous member in an upstream direction to prevent the formation of a liquid flow blocking gas bubble. Still another feature of the invention is that the gas arrestor may be positioned downstream of the thrust control valve. An advantage of this feature is that when the thrust control valve is turned off, trapped gas and remaining liquid is vented through the gas generator and reaction chamber into space. This provides passive and cyclic removal of the gas without the requirement of an additional vent element.

Among the advantages of the invention are that a gas free, or substantially gas free liquid is provided for use in spacecraft applications or other applications requiring such a liquid. By positioning the gas arrestor downstream of a liquid fluid resistor, that reduces the pressure of the liquid medium, dissolved gas that generates bubbles on the pressure reduction is trapped by the gas arrestor.

In accordance with a first embodiment of the invention, there is provided a gas arrestor for separating an entrained gas from a liquid. The gas arrestor includes an inlet coupling a source of the liquid having an entrained gas component from a reservoir contained within the gas arrestor. A wall of the reservoir is formed from a first side of a porous member. The porous member has the first side and an opposing second side with pores extending therebetween. The pores are of a size effective to enable the flow of the liquid from the first side to the second side while inhibiting the flow of the entrained gas component. In one embodiment, a wick extends from the first side in a direction toward the inlet and a second conduit that is adjacent the second side receives the liquid following entrained gas separation.

In accordance with a second embodiment of the invention, there is provided a system for the delivery of a gaseous product to a reaction chamber. This system includes a fuel tank containing a liquid propellant, a pressurized gas communicating with the fuel tank and a thrust control valve disposed between the fuel tank and the reaction chamber. A gas arrestor is disposed between the fuel tank and the gas generator. The gas arrestor is effective to remove gas entrained in the liquid propellant. A gas generator receives the liquid propellant from the gas arrestor effecting decomposition of the liquid propellant to reaction gases and delivers the reaction gases to the reaction chamber.

DETAILED DESCRIPTION

Figure 1:
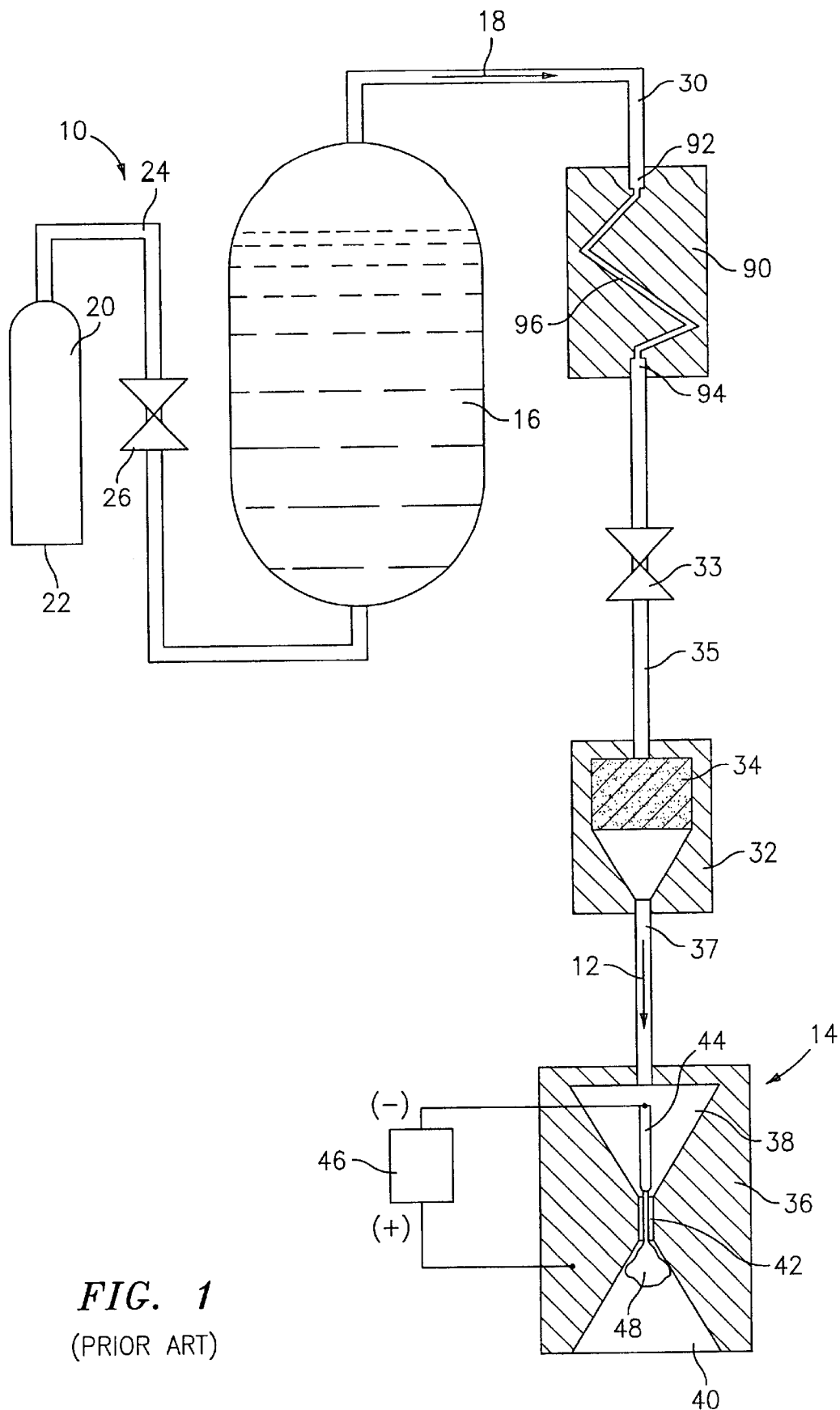
FIG. 1 shows in block diagram a system for the delivery of a gaseous product to an arcjet thruster as known from the prior art.

FIG. 1 shows in block diagram a system 10 for the delivery of a gaseous product 12 to a reaction chamber 14 as known from the prior art. The system 10 has a fuel tank 16 that contains a liquid propellant 18. The liquid propellant 18 is preferably an autocatalytic monopropellant such as hydrazine although bipropellants requiring both a liquid fuel and a liquid oxidizer may be used. The term "liquid propellant" is intended to encompass monopropellants, fuels and oxidizers.

A pressurized gas 20 housed in a pressure vessel 22 communicates with the fuel tank 16 through a first conduit 24. The pressurized gas 20 is any suitable gas that is essentially non-reactive with the conduits and with the liquid propellant 18. When the liquid propellant 18 is hydrazine, helium is preferred as the pressurized gas.

The conduits are formed from any material having chemical resistance to the liquid propellant 18, having thermal resistance to temperatures generated by a gas generator (up to 1300° F.) and capable of withstanding the system operating pressure of up to 400 psia. Stainless steel such as type 304L stainless steel (nominal composition, by weight, of 18%–20% chromium, 8%–12% nickel and the balance iron) and high performance alloys such as Inconel 600 (nominal composition, by weight, of 76% nickel, 15.5% chromium, 8% iron and 0.5% manganese) are suitable materials for the conduits.

Opening a first valve 26 disposed in the first conduit 24 by any suitable means such as mechanical, electromechanical or pyrotechnic causes the pressurized gas 20 to flow through the first conduit 24 and pressurize the liquid propellant 18.

Following pressurization of the liquid propellant 11, a portion of the pressurized gas 20 may be entrained in, or absorbed by, the liquid propellant 18. The entrained gas may manifest itself as bubbles leading to deteriorated performance of the reaction chamber 14.

A second conduit 30 joins the fuel tank 16 to a thrust control valve 33. A liquid fluid resistor 90 is interposed into the second conduit 30, preferably between the fuel tank 16 and thrust control valve 33. The liquid fluid resistor 90 provides a uniform pressure drop from the inlet 92 to the outlet 94 and also minimizes the effect of backflow pressure surges from the outlet 94 to the inlet 92. One type of liquid fluid resistor 90 includes a reduced diameter portion 96 with many twists and turns to change the direction of liquid flow many times as the liquid propellant 18 traverses the liquid fluid resistor 90.

The pressure of the liquid propellant 18 in the outlet 94 is determined by the reduced diameter and the flow geometry. This pressure is less than the pressure of the liquid propellant 18 at the inlet 92. For example, the liquid is typically at a pressure of about 255 psia at inlet 92 and at a pressure of about 100 psia at outlet 94. The pressure drop across the fluid resistor 90 can result in the release of bubbles if the pressurized liquid propellant 18 has absorbed pressurant gas 20. The decrease in pressure changes the saturation point of the liquid propellant 18, releasing the pressurant gas 20 from the solution.

Relatively small bubbles of pressurant gas at the higher pressure expand when the pressure of the liquid is reduced increasing the effect of the bubble and leading to the positive and negative voltage excursions described hereinabove.

The thrust control valve 33 controls initiation and termination of the flow of the pressurized liquid propellant 18 to a gas generator 32. A third conduit 35 joins the thrust control valve 33 to the gas generator 32. The gas generator 32 contains a porous catalyst bed 34 of any suitable material that catalyzes the decomposition of the liquid propellant 18. When the liquid propellant 18 is hydrazine, one suitable catalyst is iridium deposited on a porous alumina substrate.

The pressurized liquid propellant 18 is decomposed to a gaseous product 12. For hydrazine, the gaseous product is a mixture of hydrogen gas and nitrogen gas. The decomposition of the liquid propellant 18 to the gaseous product 12 results in a rapid volumetric expansion accelerating the gaseous product 12 to the reaction chamber 14 through a fourth conduit 37.

The reaction chamber 14 may comprise any suitable device such as an arcjet thruster. FIG. 1 illustrates an arcjet thruster having an anode body 36 usually manufactured from tungsten or a tungsten alloy. The anode body 36 is disposed about a central cavity having an upstream converging portion 38 and a diverging downstream portion 40. Disposed between the converging upstream portion 38 and the diverging downstream portion 40 is a reduced diameter throat 42. A cathode 44 is disposed in the upstream converging portion 38 and approaches the throat 42. When a voltage is applied through a power controller 46, an electric arc 48 bridges the cathode in the upstream converging portion 38. The force of the gaseous product 12 traversing the arcjet thruster 14 forces the electric arc 48 through the throat 42. In steady state operation, the electric arc attaches to a wall of the downstream diverging portion 40. The heat generated by the electric arc 46 heats the gaseous product to a temperature of about 20,000 K generating a plasma. Expulsion of the hot plasma through the diverging portion 40 propels the spacecraft.

To minimize or eliminate the detrimental effect of entrained gas bubbles, a system for separating an entrained gas from a liquid medium is inserted into the system 10. Preferably, a gas arrestor is inserted downstream of the liquid fluid resistor 90 for effectiveness in capturing bubbles released by the pressure drop caused by the liquid fluid resistor. More preferably, the gas arrestor is disposed between the thrust control valve 33 and the gas generator 32. "Upstream" and "downstream" refer to the anticipated flow of propellant through the system 10. Downstream is in the direction indicated by the flow arrows associated with gaseous product 12 and liquid propellant 18. Upstream is in the opposite direction.

Figure 2:
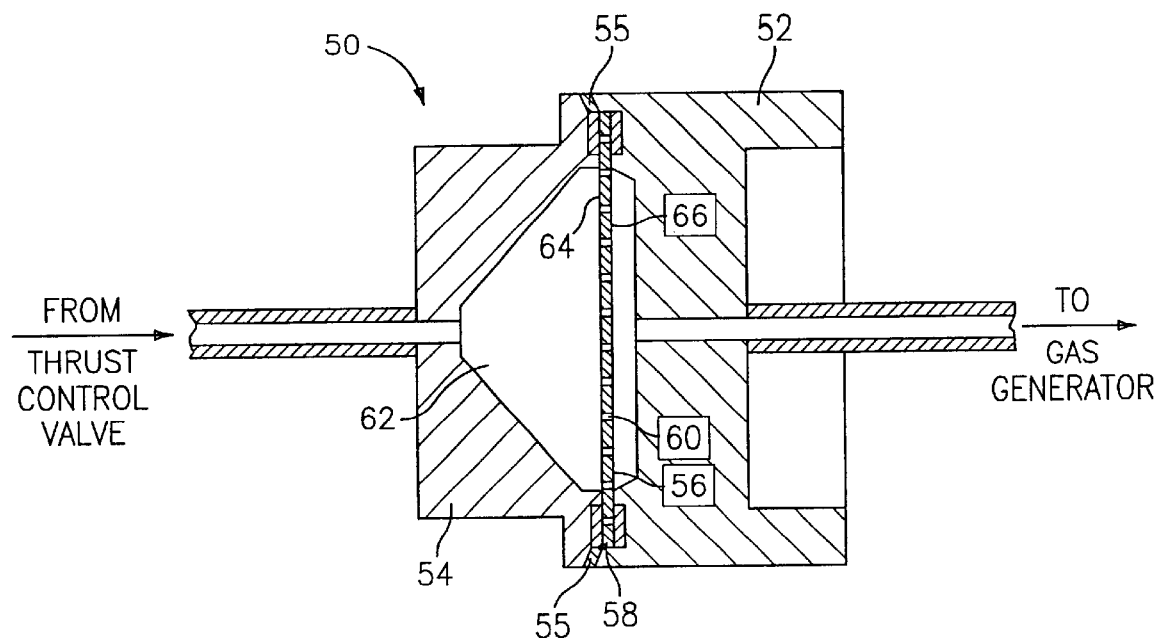
FIG. 2 illustrates in cross-sectional representation a gas arrestor in accordance with a first embodiment of the invention.

FIG. 2 illustrates in cross-sectional representation a gas arrestor 50 in accordance with a first embodiment of the invention. The reference arrows indicate the direction of flow of the liquid propellant in a downstream direction, from the thrust control valve to the gas generator. The gas arrestor 50 has a forward housing 52 and rear housing 54 joined together by any suitable means. Preferably, the joint 55 is welded, although other joints, both permanent and removable, such as bolts to enable replacement of gas arrestor components, may be used. The joint should be hermetic to prevent liquid propellant from leaking or migrating around the porous member.

A liquid/gas separator 56 is disposed between the forward housing 52 and rear housing 54. To provide hermeticity, a metallic gasket 58 is disposed between the housing components and the liquid/gas separator. One preferred metallic gasket is formed from nickel or a dilute nickel base alloy.

A suitable liquid/gas separator is a metallic screen formed from a material that is not corroded by contact with the liquid propellant. A preferred material is a titanium or titanium base alloy screen. By base, it is meant that the alloy includes at least 50%, by weight, of titanium. The screen includes a plurality of pores 60 with an open area of a size effective to enable the flow of the liquid medium. A suitable size for the pores 60 is to have a particle retention size of from about 20 microns to about 75 microns. More preferred is a pore size with particle retention of from about 20 microns to about 40 microns by 40 microns.

One exemplary material is a titanium screen having a 120 by 500 mesh Dutch twill with a wire diameter of 0.004 inch for the warp wires and 0.0027 inch for the weft (also referred to as shute) wires. The material is rated as having a particle retention size of 35 microns.

Figure 3:
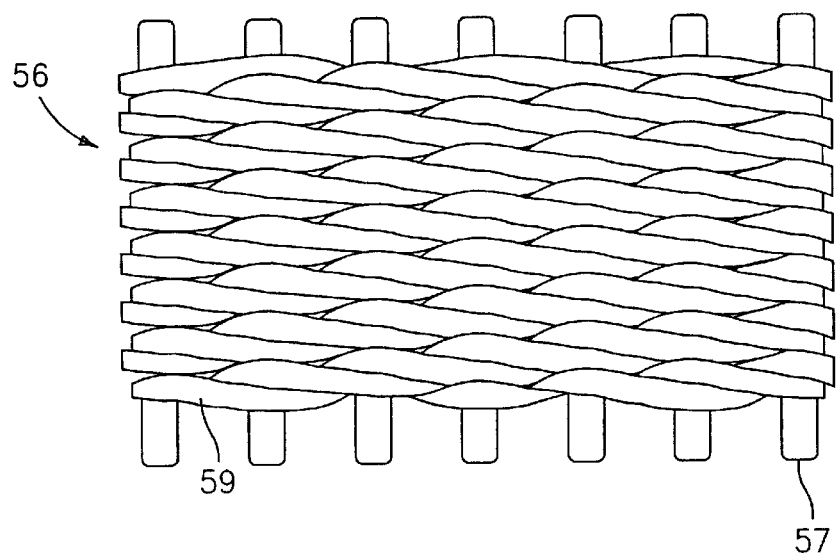
FIG. 3 illustrates a Dutch weave as used in a pore containing member in a gas arrestor.

The type of weave is important as the weave type controls the capillary action of the material in combination with the surface tension. With reference to FIG. 3, that illustrates a Dutch twill weave, the term "twill" indicates that the warp and the weft wires pass alternately over two and under two wires. The term "Dutch" refers to the use of a heavier warp wire 57 diameter in conjunction with a lighter shute wire 59 diameter. In a Dutch twill weave, there is a shute wire above and below the warp wires creating a dense weave with the warp wires completely covered. The flow-pass geometry is extremely tortuous insuring excellent bubble retention.

Figure 6:
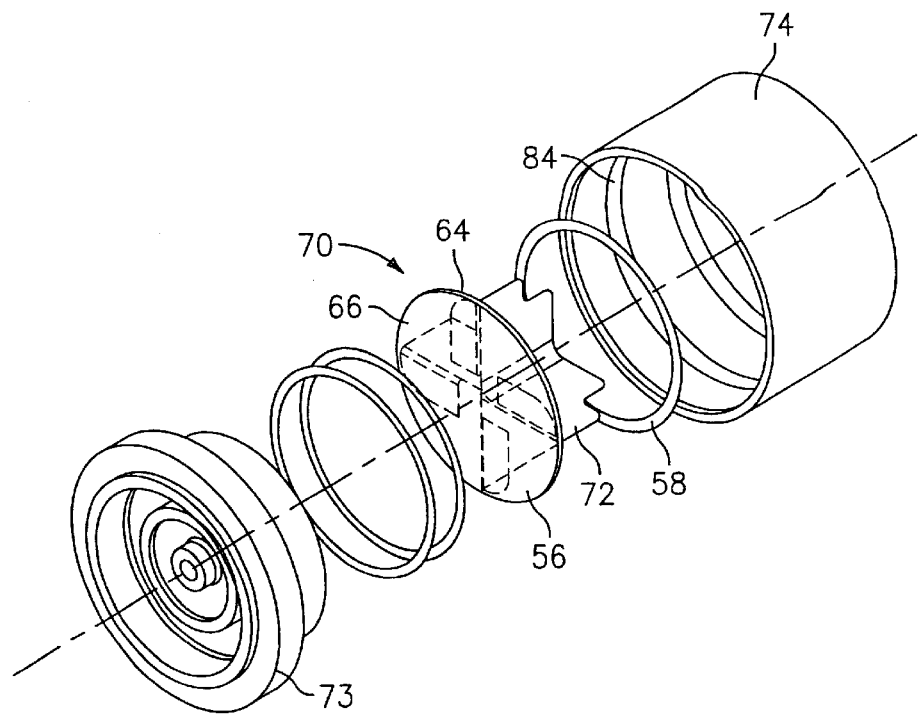
FIG. 6 is an exploded perspective view of a gas arrestor of the type illustrated in FIG. 3.

With reference back to FIG. 2, when the arcjet thruster is in operation, liquid propellant flows from the thrust control valve filling the reservoir 62 defined by inner surfaces of rear housing 54 and liquid/gas separator 56. While the reservoir illustrated in FIG. 2 is conical, any suitable reservoir shape may be utilized. For example, the exploded view of FIG. 6 illustrates a cylindrical reservoir. The liquid propellant contacts a first surface 64 of the liquid/gas separator 56. The liquid component passes through the pores 60 by capillary action exiting on the second surface 66 of the liquid/gas separator providing essentially gas-free liquid propellant for delivery to the gas generator. The entrained gas remains trapped in reservoir 62.

Once the arcjet thruster has performed the necessary maneuver, the system downstream of the thrust control valve is exposed to the vacuum of outer space expelling the trapped gas bubbles and remaining liquid through the thruster. This advantage, achieved when the gas arrestor is downstream of the thrust control valve, provides for passive and cyclic venting of the gas following each arcjet thruster duty cycle. Since the thruster is now in an off state, the combination of liquid and gas has no effect on thruster operation.

While the embodiment illustrated in FIG. 2 has been shown to work satisfactorily, gas bubbles tend to accumulate along the first surface 64 of the liquid/gas separator. Over time, a gaseous barrier impedes the flow of liquid through the liquid/gas separator necessitating an increase in pressure that also causes a portion of the gas to pass through pores 60 leading to the detrimental voltage excursions discussed above.

Figure 4:
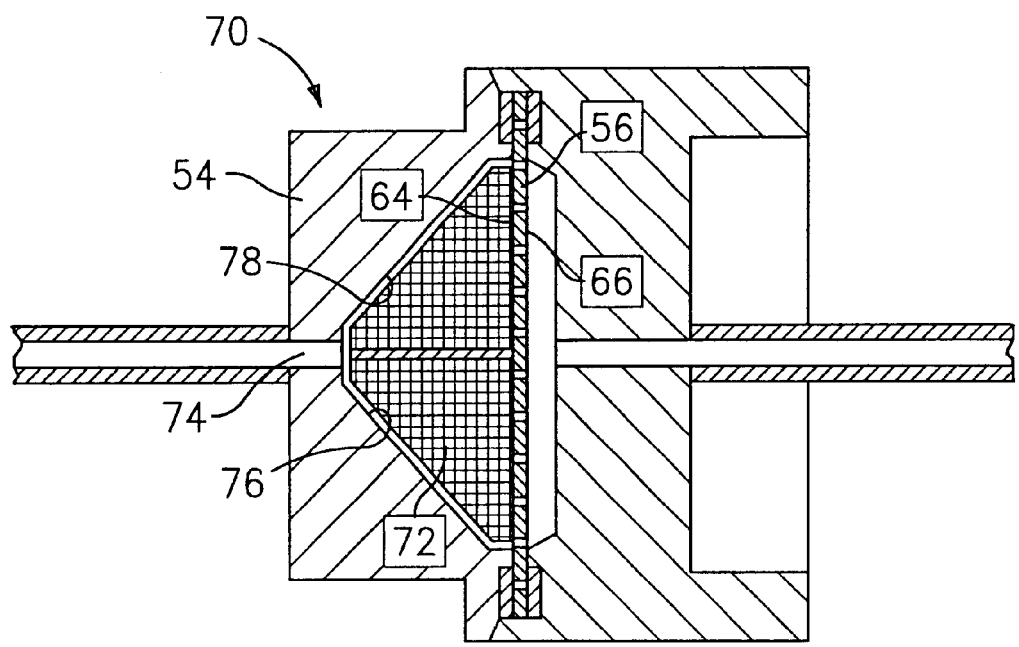
FIG. 4 illustrates in cross-sectional representation a gas arrestor in accordance with a second embodiment of the invention.

The gas film is eliminated by utilizing the gas arrestor 70 illustrated in FIG. 4. A wick 72 contacts the liquid/gas separator 56. The wick is any material that may effectively move liquid propellant from an inlet 74 of the gas arrestor 70 to the first surface 64. Preferably, this transport is by capillary action and the wick 72 is formed from a material that facilitates such capillary motion. In a preferred embodiment, the wick 72 is formed from the same material as liquid/gas separator 56.

In one embodiment, the wick 72 is formed of a plurality of screen members extending from the first surface 64 in the direction of inlet 74. To avoid distortion of the extension members, a small gap 76 is retained between inside surface 78 of rear housing 54 and the extension members. Preferably, this gap is on the order of 0.01 inch–0.03 inch and more preferably is nominally 0.02 inch.

Figure 5:
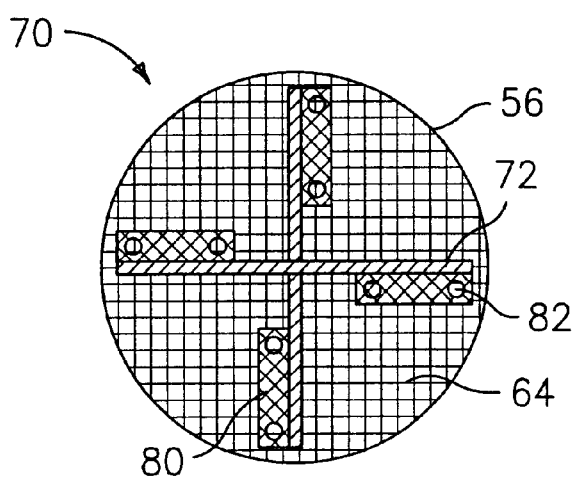
FIG. 5 illustrates in bottom planar view a combination of a pore containing member and a wick forming a component of the gas arrestor of FIG. 3.

FIG. 5 illustrates one embodiment of gas arrestor 70 viewed in bottom planar view. The wick 72 is in the form of two intersecting extension members forming a cruciform, although other shapes are certainly equally adequate. Tabs 80 extend from the surface of the wick contacting first surface 64. The tabs 80 are bonded to the first surface 64 such as by welds 82. While welding or some other mechanism whereby the wick becomes integral with the liquid gas separator 56 is preferred, a non-integral structure, such as compressively pressing a wick material against the first surface may also be employed.

As long as a sufficiently thick film of liquid propellant extends from the inlet to the first surface 64, the size of the collected bubble could be increased significantly beyond the size of the bubble capable of being retained in the FIG. 2 embodiment without increasing liquid pressure.

FIG. 6 illustrates in exploded view the gas arrestor 70 including a rear housing 74 and forward housing 73 to support the liquid/gas separator 56/wick 72 assembly. A plurality of metallic gaskets 58 supported by flanges 84 provides hermeticity. While a single metallic gasket provides sufficient hermeticity on both the first surface 64 side and the second surface side 66, multiple gaskets are preferred, as illustrated on the second surface side 66 to compensate for manufacturing tolerances.

Figure 7:
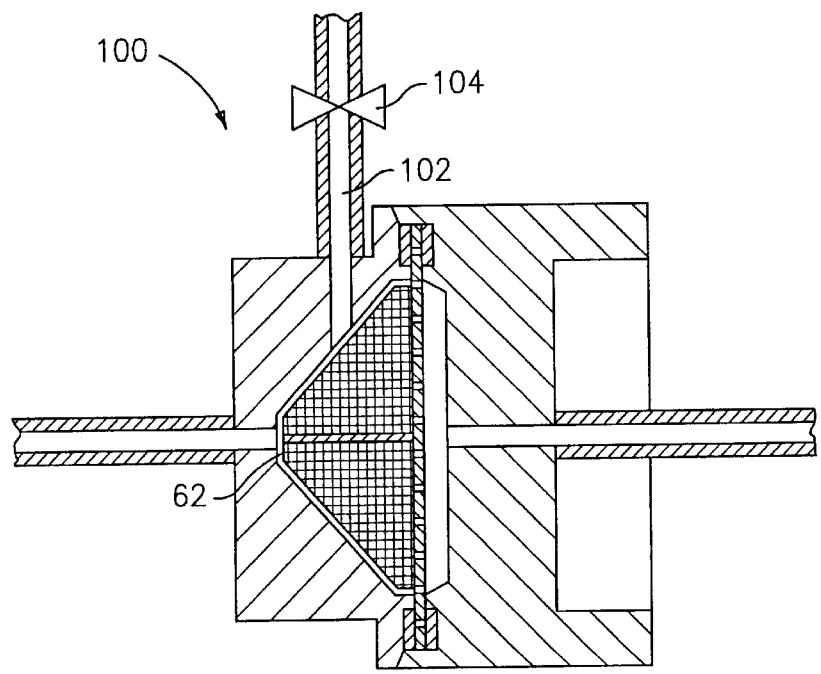
FIG. 7 in cross-sectional representation an alternative embodiment for the removal of entrained gas from a gas arrestor of the type illustrated in FIG. 3.

FIG. 7 illustrates a gas arrestor 100 in accordance with a third embodiment of the invention. In this embodiment, a vent 102 having a mechanically or electrically actuated vent valve 104 extends into reservoir 62. Such a vent may be required when the gas arrestor can not be positioned downstream of the thrust control valve, when liquid remaining in the system following arcject shut off is to be recycled, or for other reasons. The vent 102 enables periodic venting of the gas contained within reservoir 62 without the requirement of terminating power to the arcjet thruster. If the gas arrestor is to be operated in a gravity environment, the vent hole is positioned on an upwardly facing surface of the arrestor to provide gravitational separation between gas and liquid. Operation of a vent valve in a microgravity environment would likely further require the application of a vacuum to draw off the accumulated gas. In addition, since the fluid in the gas arrestor is under pressure, venting must be controlled to minimize causing a pressure drop detrimental to operation of the system.

Alternatively, vent 102 is directed to return a gas rich liquid to a consumer of liquid propellant that is not as sensitive to the presence of gas bubbles, for example monopropellant and bipropellant chemical thrusters.

While primarily drawn to application with an arcjet thruster for spacecraft attitude control, the gas arrestors of the invention are not limited to arcjet thruster applications. Such other applications including any spacecraft propulsion device where gas-free, or substantially gas-free, propellants will improve performance such as monopropellant thrusters and bipropellant thrusters. Such a bipropellant thruster application may arise where a controlled, repeatable chemical reaction depends on the exact mixing ratio of the fuel and oxidizer components. The gas arrestors of the invention may be used in any application that requires a gasless liquid flow including, but not limited to applications where pumps would start to cavitate if gas is ingested, chemical process controls where a precise mixture of the introduced reagents is required that would be disturbed by ingested gas, physical processes such as metallurgy, medical applications and food processing.

It is apparent that there has been provided in accordance with the invention a system to deliver a reduced gas content liquid that fully satisfies the objects, means and advantages set forth hereinabove. While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A gas arrestor for separating an entrained gas from a liquid, comprising:

an inlet coupling a source of said liquid having an entrained gas component from a reservoir contained within said gas arrestor, a wall of said reservoir being formed from a first side of a porous member;

said porous member having said first side and an opposing second side with pores extending therebetween, said pores of a size effective to enable the flow of said liquid from said first side to said second side by capillary action while inhibiting the flow of said entrained gas component;

a wick extending from said first side in a direction toward said inlet; and a second conduit adjacent said second side for receiving said liquid following entrained gas separation.

2. The gas arrestor of claim 1 wherein said pores have a particle retention size of between 20 microns and 75 microns.

3. The gas arrestor of claim 2 wherein said pores have a particle retention size of between 20 microns and 40 microns.

4. The gas arrestor of claim 3 wherein said porous mender is formed from a woven mesh.

5. The gas arrestor of claim 4 wherein said woven mesh is titanium.

6. A gas arrestor for separating an entrained gas from a liquid, comprising:

an inlet coupling a source of said liquid having an entrained gas component from a reservoir contained within said gas arrestor, a wall of said reservoir being formed from a first side of a titanium porous member;

said porous member formed into a Dutch twill weave and having said first side and an opposing second side with pores extending therebetween, said pores of a size effective to enable the flow of said liquid from said first side to said second side by capillary action while inhibiting the flow of said entrained gas component and having a particle retention size of between 20 and 75 microns;

a wick extending from said first side in a direction toward said inlet; and a second conduit adjacent said second side for receiving said liquid following entrained gas separation.

7. The gas arrestor of claim 4 wherein said porous member is integral with said wick.

8. The gas arrestor of claim 7 wherein said porous member and said wick are formed of the same material.

9. A gas arrestor for separating an entrained gas from a liquid, comprising:

an inlet coupling a source of said liquid having an entrained gas component from a reservoir contained within said gas arrestor, a wall of said reservoir being formed from a first side of a porous member formed from woven mesh;

said porous member having said first side and an opposing second side with pores extending therebetween, said pores of a size effective to enable the flow of said liquid from said first side to said second side by capillary action while inhibiting the flow of said entrained gas component and having a particle retention size of between 20 and 75 microns;

a wick, integral with said porous member and formed from the same material, extending from said first side in a direction toward said inlet, said wick being in the form of a plurality of woven mesh screens having a cruciform cross section and spaced from walls of said reservoir; and a second conduit adjacent said second side for receiving said liquid following entrained gas separation.

10. The gas arrestor of claim 9 wherein said wick is spaced from 0.01 inch to 0.03 inch from said walls of said reservoir.

11. The gas arrestor of claim 8 wherein a vent extends from said reservoir.

12. The gas arrestor of claim 1 wherein said gas arrestor is suitable for use in a micro-gravity environment.

* * * * *